US007165105B2

(12) United States Patent
Reiner et al.

(10) Patent No.: US 7,165,105 B2
(45) Date of Patent: Jan. 16, 2007

(54) SYSTEM AND METHOD FOR LOGICAL VIEW ANALYSIS AND VISUALIZATION OF USER BEHAVIOR IN A DISTRIBUTED COMPUTER NETWORK

(75) Inventors: David Reiner, Lexington, MA (US); Ming Tan, Newton, MA (US); Panagiotis Ventikos, Purcellville, VA (US); Eric Richard, Cambridge, MA (US)

(73) Assignee: NetGenesis Corporation, Cambridge, MA (US)

( * ) Notice: Subject to any disclaimer, the term of this patent is extended or adjusted under 35 U.S.C. 154(b) by 613 days.

(21) Appl. No.: 09/906,893

(22) Filed: Jul. 16, 2001

(65) Prior Publication Data

US 2003/0023715 A1 Jan. 30, 2003

(51) Int. Cl.
*G06F 15/173* (2006.01)
(52) U.S. Cl. .................... 709/224; 709/217; 707/10; 707/7
(58) Field of Classification Search ................ 709/224, 709/217, 203, 226; 707/10, 6, 101; 715/700
See application file for complete search history.

(56) References Cited

U.S. PATENT DOCUMENTS

| | | | | |
|---|---|---|---|---|
| 5,933,827 A * | 8/1999 | Cole et al. | ..................... | 707/10 |
| 6,138,155 A * | 10/2000 | Davis et al. | ................. | 709/224 |
| 6,216,134 B1 * | 4/2001 | Heckerman et al. | ..... | 707/104.1 |
| 6,285,983 B1 * | 9/2001 | Jenkins | ......................... | 705/10 |
| 6,334,110 B1 * | 12/2001 | Walter et al. | .................. | 705/14 |
| 6,338,066 B1 * | 1/2002 | Martin et al. | .................. | 707/10 |
| 6,401,118 B1 * | 6/2002 | Thomas | ....................... | 709/224 |
| 6,415,322 B1 * | 7/2002 | Jaye | ........................... | 709/224 |
| 6,643,696 B1 * | 11/2003 | Davis et al. | ................. | 709/224 |
| 6,681,247 B1 * | 1/2004 | Payton | ........................ | 709/217 |
| 6,691,106 B1 * | 2/2004 | Sathyanarayan | ............... | 707/3 |
| 6,714,975 B1 * | 3/2004 | Aggarwal et al. | ........... | 709/224 |
| 6,742,003 B1 * | 5/2004 | Heckerman et al. | ..... | 707/104.1 |

(Continued)

OTHER PUBLICATIONS net.Analysis®, "An Architecture for Acquiring E-Business Intelligence," company brochure, net.Genesis Corp., 1998, pp. 1-21.

(Continued)

*Primary Examiner*—Abdullahi Salad
(74) *Attorney, Agent, or Firm*—Nutter, McClennen & Fish, LLP

(57) ABSTRACT

A method for logical view visualization of user behavior in a networked computer environment that includes sites that a user may visit and wherein the sites comprise pages that the user may view and/or resources that the user may request includes the step of collecting raw data representing user behavior which can include requesting resources, viewing pages and visiting sites by the user. This raw data is then refined or pre-processed into page views and visit data and stored in a data mart. Pages are clustered into super pages, and page to super page mappings reflecting the relationship between pages and super pages are stored in the data mart. An automated clustering means is applied to the page view, visit and super page data in the data mart to discover clusters of visits to define super visits having visit behavior characteristics. The visit data stored in the data mart is then scored against the super visit clusters to classify visits into super visits according to visit behavior characteristics. A system is also provided.

33 Claims, 17 Drawing Sheets

U.S. PATENT DOCUMENTS

| | | | |
|---|---|---|---|
| 6,757,691 B1* | 6/2004 | Welsh et al. | 707/104.1 |
| 6,763,386 B1* | 7/2004 | Davis et al. | 709/224 |
| 6,836,773 B1* | 12/2004 | Tamayo et al. | 707/6 |
| 6,912,525 B1* | 6/2005 | Chipalkatti et al. | 707/5 |
| 6,941,321 B1* | 9/2005 | Schuetze et al. | 707/103 R |
| 2002/0152090 A1* | 10/2002 | Kobayashi et al. | 705/1 |
| 2002/0152192 A1* | 10/2002 | Zaiken et al. | 707/1 |
| 2004/0181554 A1* | 9/2004 | Heckerman et al. | 707/104.1 |
| 2004/0233235 A1* | 11/2004 | Rubin et al. | 345/738 |

OTHER PUBLICATIONS net.Analysis®, "An Architecture for Acquiring E-Business Intelligence," company brochure, net.Genesis, 1999, pp. 1-23.

E-Metrics, "Business Metrics for the New Economy," company brochure, net.Genesis, 2000, pp. 1-62.

Design for Analysis, "Delivering the Promise of E-Business Intelligence," company brochure, net.Genesis, 1999, pp. 1-14.

CartSmarts™, net.Genesis CartSmarts™ is the only e-retail solution that . . . , company brochure, net.Genesis, 1999, pp. 1-2.

Zhang et al., "BIRCH: An Efficient Data Clustering Method for Very Large Databases," *Proceedings of the ACM SIGMOD Conference on Management of Data*, 1996, pp. 103-114.

SPSS®, "Interact With Your Customers More Effectively," wysiwyg://42/http://www.spss.com/SmartScore, SPSS, Inc., 2001, pp. 1-2.

SPSS®, "If You Can Envision It, You Can Build It With nViZn™," wysiwyg://42/http://www.spss.com/ SmartScore, SPSS, Inc., 2001, pp. 1-7.

"The SPSS TwoSTep Cluster Component," company white paper—technical support, SPSS®, 2001, pp. 1-9.

Reiner, David, "E-Metrics Solutions for the New Economy: The NetGenesis Enterprise Architecture," NetGenesis, 2001, pp. 1-40.

* cited by examiner

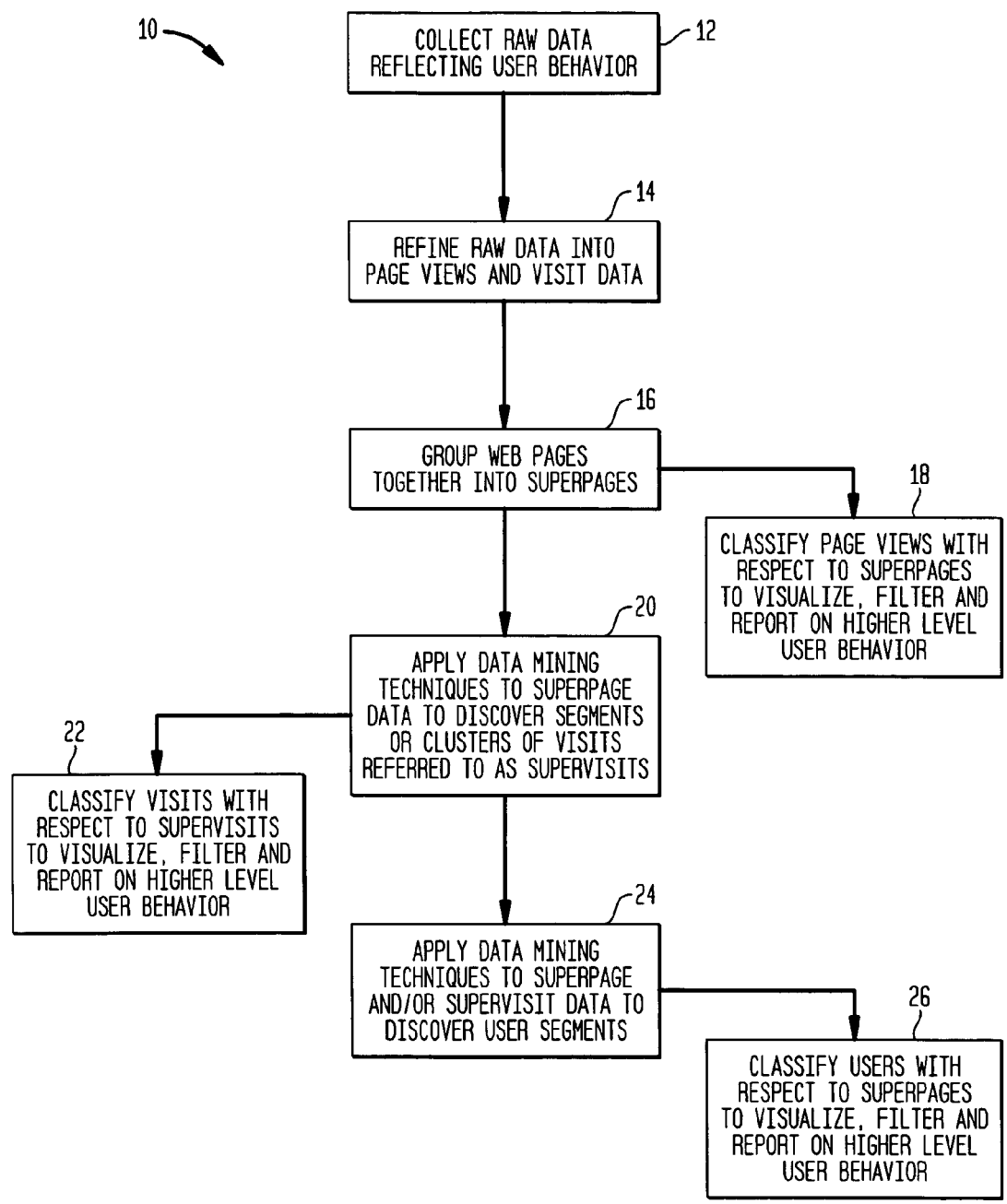

THE THICKNESS OF LINKS AND THE SIZE OF NODES
INDICATE THE AMOUNT OF TRAFFIC

FIG. 4C

| HIT & RUN | ADVICE | ROOM | SEEK & FIND | ENGAGE | SEEK & MISS | JUST CATEGORIES | HOME PAGE ONLY | FOCUSED | USER TRANSACTION RATE | USERS | # OF VISITS WITH A TRANSACTION |
|---|---|---|---|---|---|---|---|---|---|---|---|
| X | X | X | X | X | X | X | X | X | 47.37% | 19 | 9 |
| X | X | X | X | X | X | X | X |   | 28.57% | 7 | 2 |
| X | X | X | X | X | X | X |   | X | 20.00% | 10 | 2 |
| X | X | X | X | X | X |   | X | X | 13.33% | 45 | 6 |
| X | X | X | X | X |   | X | X | X | 12.50% | 16 | 2 |
| X | X | X | X |   | X | X | X | X | 3.13% | 64 | 2 |
|   |   |   |   | X |   |   | X |   | 0.68% | 440 | 3 |
| X |   |   |   | X |   |   |   |   | 0.61% | 822 | 5 |
| X |   |   | X |   |   |   |   |   | 0.46% | 432 | 2 |
| X |   |   |   | X |   |   |   |   | 0.43% | 927 | 4 |
|   |   |   |   |   |   |   |   | X | 0.29% | 1,035 | 3 |
|   |   |   |   |   |   |   | X |   | 0.27% | 30,249 | 81 |
| X |   |   |   |   |   |   |   |   | 0.22% | 3,162 | 7 |
| X |   |   | X |   |   |   |   |   | 0.10% | 135,927 | 141 |
|   |   | X |   |   |   |   |   |   | 0.02% | 68,380 | 12 |
|   |   |   |   |   | X |   |   |   | 0.01% | 22,710 | 3 |
|   |   |   |   |   |   |   |   |   | 0.01% | 16,778 | 2 |
| ALL USERS |   |   |   |   |   |   |   |   | 0.054% | 570,477 | 309 |

161 USERS WITH A VERY HIGH PURCHASE POTENTIAL

*NOTE: THIS TABLE SHOWS COMBINATIONS OF MULTIPLE VISITS THAT RESULTED IN AT LEAST 2 COMPLETED TRANSACTIONS DURING THE 7 DAY PERIOD.

▨ THE SHADED AREA SHOWS THE 6 COMBINATIONS OF MULTIPLE VISIT TYPES THAT IDENTIFY USERS WITH HIGH POTENTIAL.

FIG. 6

BEHAVIOR DIFFERENTIAL ANALYSIS REPORT

| PRIOR MONTH | NO SHOW | VISITOR | BROWSER | THINKER* | LOGGER | XACTOR | REPEAT X |
|---|---|---|---|---|---|---|---|
| THIS MONTH | | | | | | | |
| NO SHOW | | 118,429 | 167,654 | 46,702 | 67,438 | 21,908 | 17,482 |
| VISITOR | 70,356 | 82,334 | 126,876 | 12,980 | 1,213 | 1,234 | 386 |
| BROWSER | 34,762 | 56,700 | 102,078 | 15,865 | 4,265 | 27,086 | 1,092 |
| THINKER* | 12,098 | 23,067 | 43,723 | 25,056 | 27,239 | 23,864 | 24,110 |
| LOGGER | 7,802 | 14,107 | 23,090 | 34,903 | 118,345 | 39,024 | 45,078 |
| TRANSACTOR | 2,343 | 10,890 | 12,376 | 15,672 | 56,017 | 24,023 | 39,161 |
| REPEAT TRANSACTOR | 1,008 | 4,567 | 4,689 | 6,234 | 22,249 | 25,345 | 34,245 |
| | | | | | | | |
| *GOAL-SETTING GUIDE, FUND EVALUATOR,... | | MEASURE=VISITOR COUNT | | | | | |

SYSTEM AND METHOD FOR LOGICAL VIEW ANALYSIS AND VISUALIZATION OF USER BEHAVIOR IN A DISTRIBUTED COMPUTER NETWORK

BACKGROUND OF THE INVENTION

With the acceptance of the World-Wide-Web ("the Web") as a core business platform, many enterprises have moved beyond Web sites that offer little more than static brochure-ware to develop sophisticated Web based application and dynamically generated content. These businesses have invested heavily to create robust and dynamic e-commerce sites that link intranets, extranets, and the Internet as they use the Web as an important mechanism for customer relationship management. These businesses have moved into the world of e-business, a world that encompasses not only e-commerce, but includes internal applications that improve an enterprise's overall sales, marketing and support process.

With substantial dollar amounts being invested in on-line businesses, businesses demand thorough cost justification and careful allocation of resources. Many marketing managers, however, are unfamiliar with the Web as a marketing medium and are unprepared to face the complexity of the e-business environment. These managers need information to allow them to accurately gauge Web marketing performance, to make informed e-business decisions and strategically integrate new marketing initiatives, and to calculate a return on their Web investments.

One approach to Web marketing analysis is disclosed in PCT publication WO 98/38614 entitled "System and Method for Analyzing Remote Traffic Data in a Distributed Computing Environment" by Boyd et al. This system takes in traffic data hits (requests for resources, or page hits) as input, and builds results tables that include characteristic data of the traffic data hits. This data can then be made available for analysis.

Such site statistics can be helpful for some uses, but they provide little information to the marketer about who is coming to the Web site and how they are behaving while they are there. This later information is critical both for evaluating existing on-line marketing efforts and for integrating new behavior based on-line marketing initiatives, including one-to-one online marketing, specific content delivery, and incentives to encourage Web consumers to choose higher value paths through the Web site.

Generating the high-level user behavioral information necessary to visualize and act on user behavior is a challenging endeavor for at least two reasons. First, the data collected by database tools, such as the one described above, is at a very low level. Users (sometimes referred to as "visitors") make one or more visits in a given time period with each visit comprising one or more page views. Information from Web server logs, network packet sniffers, and browser plug-ins (collectively referred to here as "Web logs") includes only individual resource requests (hits) rather than page views, and timestamps and cookies (a physical view of user activity) rather than coherent visit and user information. This low level data can be refined, for example by (1) reducing raw hits to page views through exclusions (typically of images, robots, and other less interesting hits); (2) grouping related page views by the same user (identified by registration information, cookie, or other combination of identifying attributes) into visits (sometimes referred to as "sessions") inferred by the proximity in time of these page views; and (3) storing the results in a database for later analysis. However, the database of page views, visits, and users is tied very firmly to the design and structure of the Web site being analyzed, and the pages on Web sites are generally defined to enable basic navigation and presentation of content to users—not to facilitate later analysis of user activity from a higher-level, logical view. As a result, providing marketers with the high level or logical view analysis of user behavior is difficult at best.

The second difficulty in using existing Web analysis tools to perform high level or logical view analysis of Web consumer behavior is that the sheer volume of data complicates analysis. There may be hundreds, thousands, or even larger numbers of pages on a site or interrelated collection of sites. In addition, both the actual pages on a site and the user population are constantly changing. Over time, the numbers of individual page views, visits and users are too large to extract meaningful patterns to analyze commonality and segment user behavior.

In order to characterize user behavior in meaningful and actionable ways, the analysis problems need to be reduced to manageable levels. It is essential to find a way to simplify the physical picture of user activity into a logical view, comprising groups of page views, visits, and users. The logical view can then be used for site optimization, personalized marketing, and customer relationship management.

SUMMARY OF THE INVENTION

The invention solves these and other problems by providing a method and system for logical view visualization of user behavior in a networked computer environment that includes sites that a user may visit and wherein the sites comprise pages that the user may view and/or resources that the user may request. One step in the method involves collecting raw data representing user behavior which can include requesting resources, viewing pages and visiting sites by the user. This raw data is then refined or pre-processed into page views and visit data and stored in a data mart. Pages are clustered in the method of the invention into super pages, and page to super page mappings reflecting the relationship between pages and super pages are stored in the data mart. An automated clustering means is applied to the page view, visit and super page data in the data mart to discover clusters of visits to define super visits having visit behavior characteristics. The visit data stored in the data mart is then scored against the super visit clusters to classify visits into super visits according to visit behavior characteristics.

The super page clusters of pages can be created manually using a set of tools devised for such clustering, or in another embodiment, an automated clustering means can be used to create the super page clusters. The super pages can also be defined in at least two types of site semantics, with page content and user behavior progress being two such types of site semantics.

In one embodiment, the automated clustering means used with the method of the invention can be a two stage clustering means having pre-clustering and clustering stages. A visit to super visit mapping can also be created during the scoring of visits and stored in the data mart. As with super pages, super visits may be defined in a plurality of types and each visit can be classified into a super visit from among each super visit type.

An automated clustering means may further be applied to page view, visit, super page and super visit data in the data mart to discover clusters of users to define user segments comprising groups of users having similar behavior. Users can then be scored against the user segments to classify the users into user segments. As with super pages and super visits, user segments can be defined within a plurality of user segment types.

A visualization means can also be employed in the method of the invention to illustrate user paths through super pages, the relationship between super visits and user behavior and attributes, or user segments and user behavior and attributes in the networked computer environment.

A system of the invention for logical view visualization of user behavior in a networked computer environment, wherein the networked computer environment includes resources, pages and sites and the user behavior includes requesting resources, viewing pages and visiting sites, includes an importer means for collecting raw data reflecting user behavior, a data mart for storing data and a preprocessing means for refining the raw data into page views and visit data for storing in a data mart. A clustering means is provided for clustering pages to define super pages and storing page to super page mappings reflecting the relationship between pages and super pages in the data mart. An automated clustering means, accepting page view, visit and super page data (including page to super page mapping) from the data mart, is also provided for discovering clusters of visits to define super visits having visit behavior characteristics. A scoring means is further provided for scoring the visit data stored in the data mart against the super visit clusters to classify visits into super visits according to visit behavior characteristics.

A further automated clustering means can be provided for accepting page view, visit, super page and super visit data from the data mart to discover clusters of users to define user segments. A scoring means can be provided to score visits against the user segments to classify the user/visits into user segments and a visualization means can also be employed in the system of the invention to illustrate user paths through super pages, the relationship between super visits and user behavior and attributes, or user segments and user behavior and attributes in the networked computer environment.

BRIEF DESCRIPTION OF THE DRAWINGS

The invention will be more fully understood from the following detailed description taken in conjunction with the accompanying drawings, in which like reference numerals designate like parts throughout the figures, and wherein:

FIG. 1 illustrates a method of the invention for analyzing user behavior in a networked computer environment;

FIG. 4C illustrates high potential users based on combinations of SuperVisits illustrated in FIG. 4;

FIG. 6 illustrates a user behavior differential analysis that can be performed using the system or method of the invention.

DETAILED DESCRIPTION OF THE INVENTION

Figure 1A:
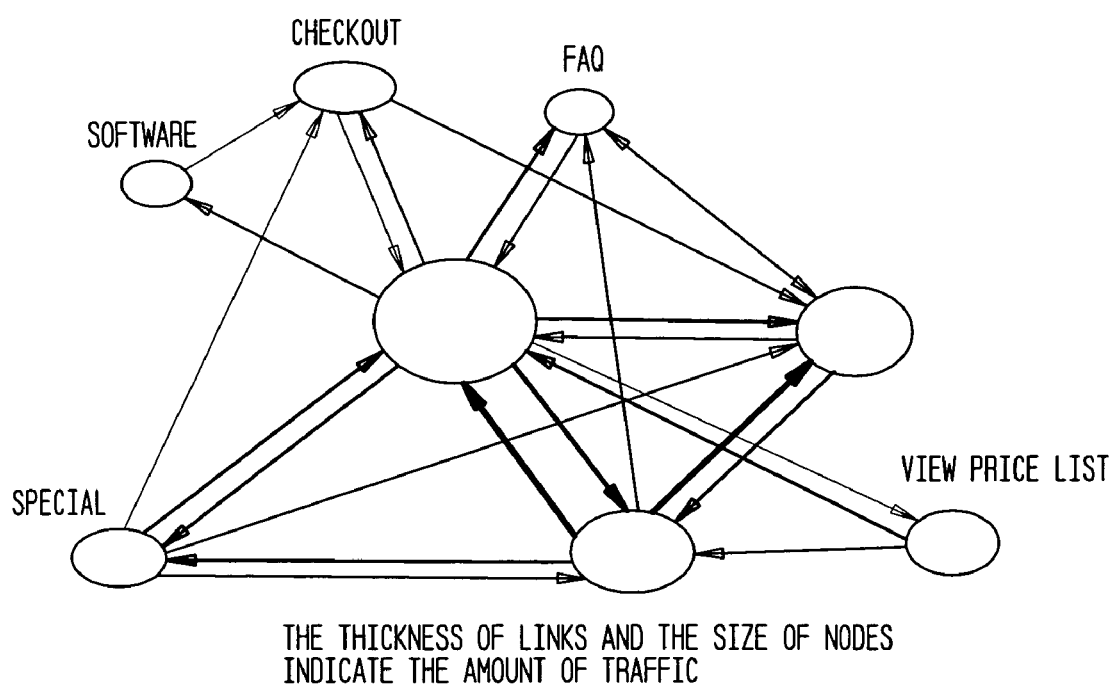
FIG. 1A illustrates a visualization of user paths through a collection of super pages grouped according to FIG. 1.

The invention provides a set of tools, described both as methods and as systems for carrying out data analysis, for converting physical or low level data reflecting the behavior of users in a networked computer environment into a high level or logical view of user behavior that be used for Web-site optimization, personalized marketing, and customer relationship management.

In an embodiment according to the method 10 of FIG. 1, users (sometimes referred to as "visitors") make one or more visits in a given time period with each visit typically comprising one or more page (typically HTML document) views or resource requests. Information regarding these user activities can be collected 12 from sources such as Web server logs, network packet sniffers, and browser plug-ins. These sources record individual resource requests (hits) rather than page views, and timestamps and cookies rather than coherent visit and visitor information. Accordingly, the next step in a method of the invention is to refine 14 the raw data collected into page view information and to define individual user visits. This refinement typically begins with reducing raw hits to page views through exclusions (typically of images, robots, and other less interesting hits). It continues with grouping of related page views by the same user (identified by registration information, cookie, or other combination of identifying attributes) into visits (sometimes referred to as "sessions"), inferred by the proximity in time of these page views or inferred by cookies. The results can be stored in a database for later analysis. The resulting database of page views, visits, and users (collectively referred to here as "the low-level view") is tied very firmly to the design and structure of the site. However, the pages on Web sites are generally defined to enable basic navigation and presentation of content to visitors, and not to facilitate later analysis of visitor activity. In addition, there may be hundreds, thousands, or even larger numbers of pages on a site. Over the time, the number of visits and users is too large to analyze them individually.

To further characterize visitor behavior in meaningful and actionable ways, the problem can be reduced to simplify the picture of visitor activity into a high-level view comprising groups of page views (super pages, or SuperPages), visits (super visits, or SuperVisits), and visitors (User Segments). This high-level view can then be leveraged for site optimization, personalized marketing, and customer relationship management.

The invention provides a new paradigm for analyzing Web visit behavior based on grouping 16 together Web pages (typically HTML documents) into SuperPages. These groupings in turn can be used to perform Web site usage analysis, including segmenting visits and users. Web page groupings can be based on many different types of site semantics, including page content and page "depth of engagement" (or progress). Other potential grouping criteria include key event, key page, dimension (e.g., geography), and level of detail. There can also be multiple types of SuperPages; each type representing a mathematical partition of the site page space. For example, types might be designated as "Content," "Progress into Site," or "Complexity." A given SuperPage can belong conceptually to a specific type—leading to a basic hierarchy of three levels: page, SuperPage, SuperPage Type. However, the hierarchy is not limited to three levels. SuperPages may further be defined recursively, as may SuperPage Types.

By scoring or classifying page views with respect to SuperPages 18, it is possible to visualize the paths Web site users take through the site. The page-to-SuperPage mapping that results from scoring can be stored explicitly in a database, or it can be implicit—inferred by rules when needed. Web behavior can then be filtered and reported on with respect to SuperPages, in particular with multidimensional (such as OLAP) tools used to mine Web or other data. Statistics and visual depictions of site activity can also be based on SuperPages. FIG. 1A provides an exemplary visualization of user paths through a Web site based on content SuperPages with the thickness of the links between the SuperPages represents the amount of traffic between the SuperPages.

As the next step in method 10, automated data mining techniques can be applied 20 to SuperPages to discover segments (interchangeably referred to as "clusters") of visits, called SuperVisits. Generally, a SuperVisit is a group (or cluster) of homogeneous visits. Visits that belong to the same SuperVisit tend to be similar, while visits that belong to different SuperVisits tend to be dissimilar.

Figure 1B:
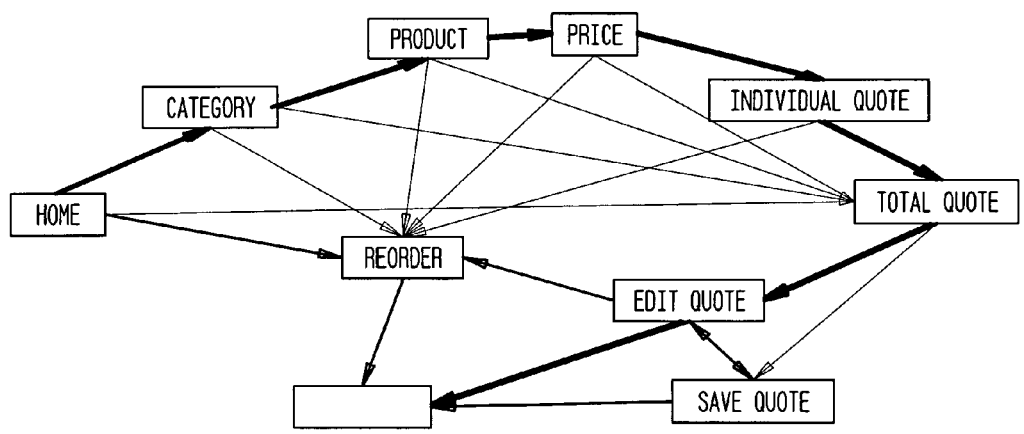
FIG. 1B illustrates a visualization of user paths through a collection of super pages for user visits belonging to a particular super visit.

Scoring or classifying visits with respect to SuperVisits 22 makes it is possible to visualize the paths Web site users take through the site during SuperVisits. A resulting vistit-to-Supervisit mapping that results from scoring can be stored explicitly in a database, or it can be implicit—inferred by rules when needed. Web behavior can then be filtered and reported on with respect to SuperVisits with multidimensional tools such as those used with SuperPages and statistics and visual depictions of site activity can also be based on SuperVisits. Business users can visualize SuperVisit characteristics by decision trees, cluster matrices, and three-dimensional scatter plots, and understand which attributes are most significant in determining segment membership. Business users can also give descriptive names to the discovered segments, such as naming the SuperVisits at a brokerage site, "Research" and "Trading." FIG. 1B provides an exemplary visualization of visits classified as "Purchase" SuperVisits showing users' progression through SuperPages named in the FIG. as the users progress through their Purchase SuperVisits (as with FIG. 1A, the thickness of the links represents the amount of traffic between the illustrated SuperPages). It is then possible to investigate specific behavioral determiners by identifying the factors that contributed their influence in a particular SuperVisit model. In addition real-time scoring of a visit as a particular SuperVisit can allow real-time site personalization in an effort to keep the user on a valued path through the site or to encourage the user to follow a higher-value site path.

As further analysis step of method 10, automated data mining techniques can be applied 24 either to SuperPages or to SuperVisits (in addition to other online and offline data) to discover User Segments. Generally, a User Segment is a group (or cluster) of homogeneous users. Users that belong to the same User Segment tend to be similar, while users that belong to different User Segments tend to be dissimilar. Significantly, the visits of a single user can belong to different SuperVisits. Thus, by segmenting users based on SuperVisits, users can be further grouped according to their site behavior beyond the scope of pages or SuperPages they visited.

Scoring or classifying users with respect to User Segments 24 makes it is possible to visualize the paths Web site users belonging to certain User Segments take through the site. A resulting user-to-User Segment mapping that results from scoring can be stored explicitly in a database, or it can be implicit—inferred by rules when needed. Web behavior can then be filtered and reported on with respect to User Segments with multidimensional tools such as those used with SuperPages and statistics and visual depictions of site activity can also be based on User Segments. Business users can also visualize User Segment characteristics and understand which attributes are most significant in determining segment membership. Business users can give descriptive names to User Segments, such as naming them at a brokerage site, "Pure Researcher," "Pure Trader," and "Mixed User." In addition, real-time scoring of a user as belonging to a particular User Segment can allow real-time customization and "one-to-one marketing" appropriate to that User Segment and its activity on the site. Further, understanding that a current or recent visit is classified as a particular SuperVisit that is either atypical or significant for the user's User Segment allows action to be taken to encourage the user to continue the behavioral change, to avoid it, or to push it further.

Figure 2:
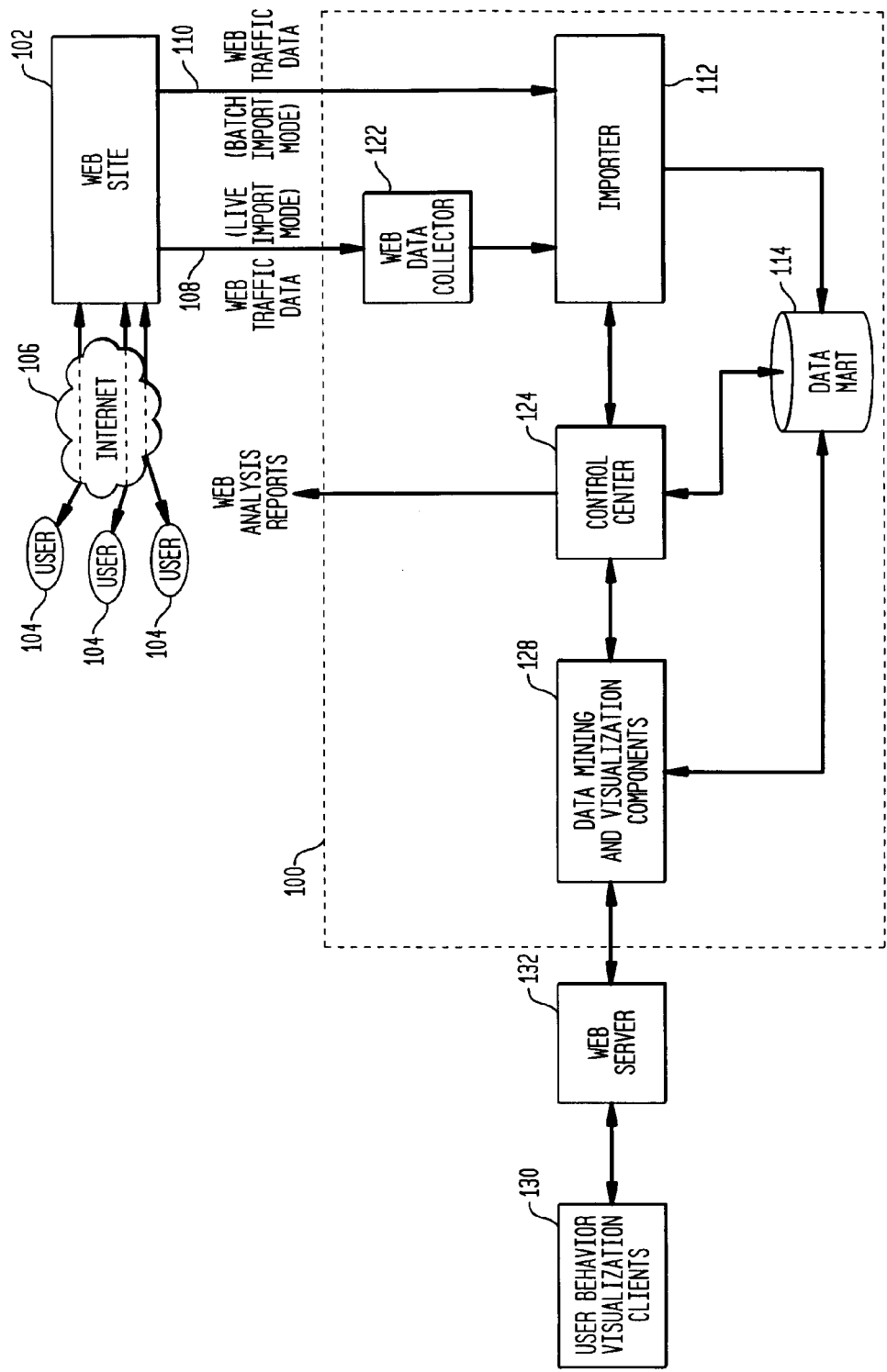
FIG. 2 illustrates a system of the invention for analyzing the behavior of a user in a networked computer environment according to FIG. 1.

The invention can be implemented using the architecture illustrated in FIG. 2. The architecture can be deployed in a distributed or networked computing environment as middleware, as a framework, as an applications framework, as one or more server processes, as an application or as a combination of these implementations. In one embodiment, the system of the invention is implemented as a Web behavior visualization platform 100 that can cooperate with a Web site 102 to take in click stream data, analyze the data, build a data store, and mine the data store to allow visualization of the behavior of users of the Web site.

Generally, an e-business serves Users 104 by interacting with them through one or more Web sites 102 or collections of interrelated Web sites. Users 104 are generally remote users who communicate with Web site 102 using a Web browser that connects to the Web site through a communications network, typically the Internet 106. Web site 102 services are provided using Web servers that typically record User 104 activities on the Web site in the form of "clickstream" or "traffic" data. Each time a User 104 requests a resource on Web site 102, a server on the Web site writes an entry in its access log or log file. A basic log entry includes information about the computer that made the request, the resource that was requested, and the date of the request. There are a variety of log formats in use today, including the Netscape/NCSA/Apache family of formats, and the Microsoft Internet Information Server family of formats, in addition to specialized formats such as the O'Reilly Website, Open Market, UUNET, Webstar, and Zeus log formats, as well as the RealAudio and Vxtreme/MS NetPlayer streaming media log formats. Each format records some combination of information about how Users 104 reached the site, what browsers they used, and what paths they took, which resources they requested, and the forms they filled in or options they selected on Web site 102.

Figure 2A:
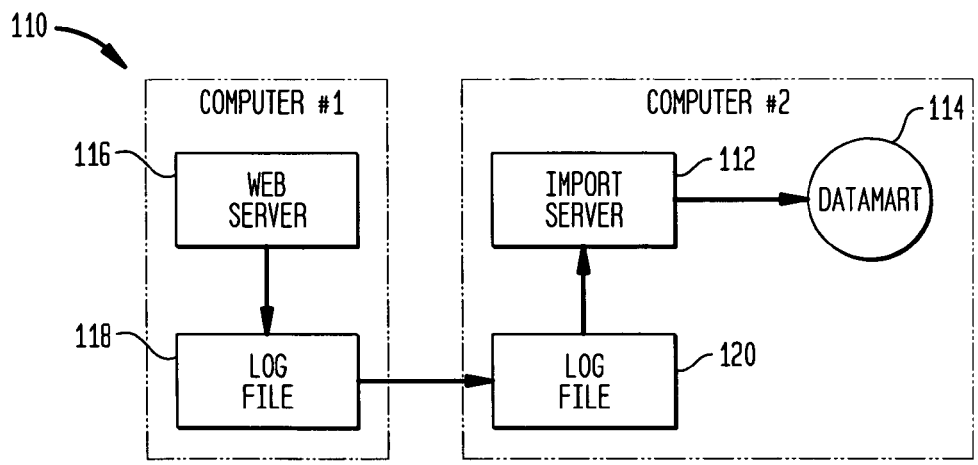
FIG. 2A illustrates one configuration for inputting data representing user requests for resources into the system of FIG. 2.

The system of the invention can gather traffic data from on-line data sources in either live 108 or batch 110 data import modes into an Import Server 112 for further processing of the data before depositing the data in a DataMart 114. Most Web server log files are "rotated" on a daily basis to manage disk space and archive old data. When a server rotates a log file, it "cuts" the log file at a set time, which simply means that it stops writing data to the current day's log file and begins recording it in the next day's log file. In one embodiment of the batch data import mode 110, illustrated in FIG. 2A, after a Web server 116 has rotated a log file 118, the log file 118 is copied, in this embodiment, to a computer on which the Import Server 112 is running. The Import Server 112 then reads and processes the log file 118 and writes the data to the DataMart 114.

Figure 2B:
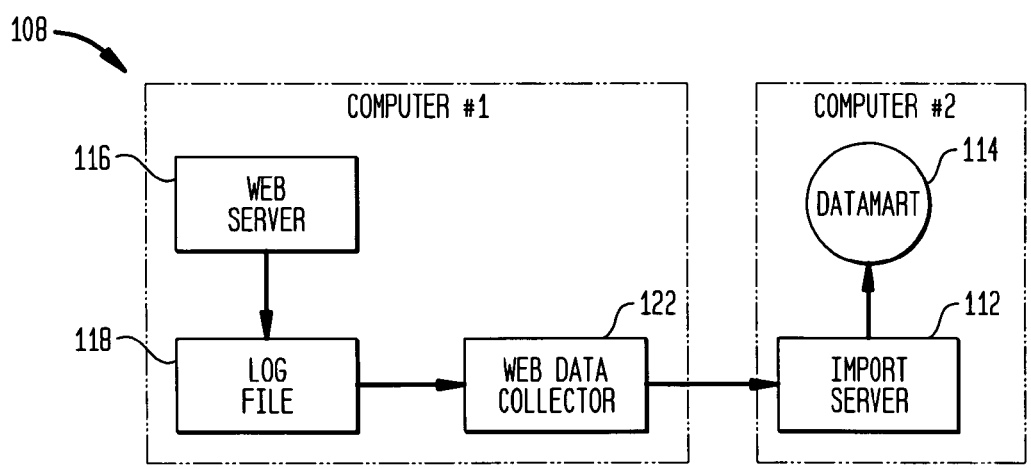
FIG. 2B illustrates an additional configuration for inputting data representing user requests for resources into the system of FIG. 2.

The system of the invention can also employ a live data import mode 108. A variety of live data sources, including Web server plug-ins, packet sniffers, or real-time or near real-time importation of log data by a data collection agent 122. FIG. 2B illustrates the use of a log file 118 as the live data source. In this configuration, a Web Data Collector 122 resides on a computer with the Web server 116 and log file 118, and reads the latest information as the log file is being written. The Web Data Collector 122 filters the information from the log file, then sends it to the Import Server 112, generally located on a separate computer from the Web Data Collector. The Import Server 112 processes the information and writes it to the DataMart 114. As used herein, "near real time" refers to actions taken based on data input through a live data source where the data is available on a more timely basis than data from rotated log files, though, because of the processing involved, not necessarily immediately.

Other sources of live data that can be used with or as Web Data Collector 122 include server plug-ins and packet sniffers (not shown). Server plug-ins are integrated directly with the Web Server 116 through a native API and they "watch" interactions or customer requests as they come through the server. Server plug-ins generate the same data that is stored in log files. Packet sniffers are located on the Web server's 116 network segment and report on application data contained in TCP/IP packets that stream past them on the way to the user's 104 computer. While packet sniffers can detect low level data, even more data than is recorded in the log file 118, packet sniffers both raise and are impacted by security concerns. For example, because the sniffer operates directly on live packets, packets that are encrypted will not provide useful data unless the packet has the decryption key. In addition to these sources of user activity data, data inputs can also include messages or cookies reported or stored using known data tracking features such as clear GIFs or Web beacons. In particular, Web beacons based on Java technology can send a message (typically to a server designated for such tracking) anytime a user views a page or engages in an activity that an analyst wishes to track. While these approaches provide a less complete view of user activity than log file analysis and can impact the performance of the Web-site on which the beacons are placed, they can be used with or in place of log file analysis to provide information about user activity that can be used with the present invention.

Referring back to FIG. 2, these on-line data sources feed into the Import Server 112. Where the Import Server 112 receives data from multiple sources, it "sews" the data into a coherent single data set. This can happen when data is received from multiple live sources, or, when multiple log files 118 are employed. For example, many companies employ multiple Web servers and sophisticated load balancing solutions to handle larger volumes of traffic on their Web sites. In such environments, each request made by a user may be sent to a different Web server. This results in a series of seemingly unconnected hits in different log files or coming from different Web Data Collectors 122. Sewing is the process of ordering each of the requests for resources from each of the different sources into a single chronologically ordered thread to provide a single consistent view of the data from the different servers.

The Import Server 112 then preprocesses the data. In general, this preprocessing includes filtering and hostname resolution, calculating visits, and computing aggregates or high level summaries. Hostname resolution can make up for the fact that many high-traffic Web-sites have DNS (Domain Name Server) resolution turned off to improve Web server performance. Import Server 112 can use a DNS resolution engine to turn IP addresses provided in click-stream data into hostnames and other meaningful business information (e.g., international traffic versus domestic, home users versus corporate users). In addition, a database can be incorporated into Import Server 112 to map subdomains into corporate and geographic information, allowing users to understand the identities of their users and to segment their users by location.

Calculating visits involves identifying unique user 104 visitors and reconstructing data from these unique visitors into visits that represent the customer's activity on the Web site 102. The identification of unique user 104 visitors can be based on at least one of several pieces of data that can be discerned from the log file 118. In addition, user recognition may be based on authenticated user Ids, on cookies, on hostnames plus browsers, or on specified combinations of these tokens. The demarcation of distinct visits for the visitors can be based, for example, on a selectable visit timeout interval, that is, a length of time between two requests by the same visitor before the second request is considered to be the start of a new visit, or on the treatment of each external referral to the Web site 102 as marking the start of a new visit. Preferably, Import Server reconciles visit and hit counts across different user identification methods, so that if the identification method changes during a visit, say from a cookie to a registered username, the Import Server tracks the visit. Import Server 112 also preferably ignores the information of users who have chosen to remain anonymous pursuant to a Web-site privacy policy. Import Server 112 then writes the preprocessed data to DataMart 114.

In addition to information gained through Web site 102 analysis, information from an enterprise's other on- and off-line databases and applications can be integrated into DataMart 114. Examples of enterprise information sources that can be integrated include content management systems, catalog systems, ad systems, user registration systems, local customer databases, and other marketing activity databases. Data Collection Adapters (not shown) can be configured to recognize and join these databases to correlate them with customer behavioral data gathered on line. For example, if Web site 102 employs a customer registration system, including a username and password for the customer as well as certain profile information, Data Collection Adapter functionality allows the username and other information in the customer's profile, potentially including such information as the customer's age, gender, zip code or e-mail address, to be integrated with the details of the customer's behavior on-line as stored in DataMart 114. In another example, Web sites 102 having dynamic content such as might be served by systems sold by such as the Vignette V5 Content Management Server, licensed by Vignette Corp. of Austin, Tex., URL information is coded (by way of Vignette Content URLs, for example) to refer to content buried deep in back-end content databases. A Data Collection Adapter can be configured to recognize the coding stored in such databases and can integrate that coding with the customer behavior data in DataMart 114 to result in data reflecting customer interaction with specific content served dynamically.

DataMart 114 can be a high performance relational database such as those available from Oracle, Corp., Microsoft, Inc. or IBM. In one embodiment, DataMart 114 is organized as a constellation (multi-star) schema, whose major fact tables cover three levels—hits (requests), visits, and users. Page views for any given visit can be linked together in order, making it possible to analyze complete clickstream sequences. Dimension tables can include resources, browsers/platforms, subdomain/organization, time, referring sites, query string elements (both those from actual user searches and those used to describe dynamically served content, and many other online data elements.

Referring again to FIG. 2, Control Center 124 provides administration and management capability for the system. Control Center 124 can be used, for example, to configure inputs to the DataMart 114, or to establish scheduled or automatic data importing and report publishing events. Control Center 124 can allow browser-based interaction to allow administrator access to the Administrative Console functionality. Further, Control Center 124 can include an automated publishing system, providing tools for an administrator to schedule the preparation and publication of the various reports on data collected and stored in DataMart 114.

An exemplary analytics platform having several of the features and components described above is NetGenesis 5 analysis software solution licensed by NetGenesis Corp. of Cambridge, Mass., the features of which are further described in D. Reiner, "The NetGenesis Enterprise Architecture," published in 2001 by NetGenesis Corp. and available at http://www.netgenesis.com and in the present patent application file, which document is incorporated herein by reference.

The system of the invention further includes Data Mining and Visualization Components 128 for applying the data mining operations described above with respect to FIG. 1 and for visualizing the results. A data mining framework 200 for carrying out the data mining operations of the invention can be described with respect to FIG. 3. The data mining framework operates on preprocessed data in the DataMart 114 and can proceed in any order illustrated by the arrowed paths in FIG. 3. This framework 200 will be described however, with respect to a preferred embodiment of the invention in which data mining flows first through SuperPages 210, then SuperVisits 212, and then User Segments 214 in successive levels of data mining analysis. This level-based framework reduces the complexity of the data mining analysis by reducing the number of dimensions analyzed at each level.

At the first SuperPage 210 level, there are mainly three phases: (1) define SuperPages, (2) review SuperPages, and (3) map pages to SuperPages. A user of framework 200 can play an active role in defining various SuperPages from Web data. While the data mining components described below can be used to discover SuperPages, due to the complexity and large multidimensionality of the data stored in DataMart 114, and further due to the fact that SuperPage groupings will generally be most useful if they follow the design of Web site 102, the definition of SuperPages is preferably performed by a framework 200 user familiar with the semantics of Web site 102.

Web page groupings into SuperPages can be based on many different types of site semantics, including page content and behavior progress, site directory, or product. Other potential grouping criteria include customer lifecycle event, key page, dimension (e.g., geography), and level of detail. By classifying page views into SuperPages, it is possible to report or visualize the paths visitors take through the site with respect to the site semantics. Web behavior can be filtered and reported on with respect to SuperPages. Statistical or visual depictions of site activity can be based on SuperPages. Following a review to validate the groupings, the page-to-SuperPage mapping can be stored explicitly in DataMart 114.

The Data Mining and Visualization Components 128 (FIG. 2) can offer users several different methods to capture their domain knowledge about the structure of their site to define SuperPages. Specifically, users can have the ability to select the sets of pages that comprise a SuperPage. In a template-assisted method, a template can be provided to define a SuperPage that specifies "Starting with", "Ending with","Containing","Notcontaining","Excludingthesuffix", and "Excluding the prefix" conditions to match Web page URLs. On the other hand, in a user-defined method, a user can be given an option to specify an arbitrary SQL matching pattern (including wild cards) to select Web pages. For example, one can use a pattern "/product/workstation/%" to define a workstation SuperPage to include every page under the directory/product/workstation. An exemplary dialog screen for defining SuperPages is illustrated in FIG. 3A.

The second SuperVisit 212 level can also comprise three phases: (1) creation—cluster visits, (2) validation—visualize SuperVisits, and (3) scoring (deploying the SuperVisit model). The input data for the SuperVisit analysis comes from SuperPages and the Web behavior data in DataMart 114. The creation of SuperVisits can be done automatically by a clustering component of the Data Mining and Visualization Components 128 (FIG. 2). After a clustering model is created, a framework 200 user can validate the modeling result through model visualization and repeat phase (1) if necessary. When the framework 200 user is satisfied with the validation results, the SuperVisit model can be used to score further visits.

A SuperVisit is a group (or cluster) of logically similar visits; visits that belong to the same SuperVisit tend to be similar, while visits that belong to different SuperVisits tend to be dissimilar. A user must define a SuperVisit type (i.e., model type) before modeling SuperVisits. A visit can belong to different SuperVisits of different types.

Automated data mining techniques can be applied to automatically discover clusters of visits that form SuperVisits. To discover SuperVisits, a framework 200 user first selects some attributes from a list of available attributes. Potential attributes for modeling SuperVisits include visited SuperPages, visit-level online metrics (e.g., duration), geographic/technographic identifiers (e.g., organization type), and various timestamp flags (e.g., first-visit-flag and weekend flag). The user also specifies visit filter criteria that include time range, the required minimum and maximum numbers of page views in a visit, the SuperPages that a visit must include, and the SuperVisits that a visit must belong to. An exemplary dialog screen for entering this information for SuperPage modeling is illustrated in FIG. 3B.

The use of SuperPages at this level for grouping visits into SuperVisits greatly reduces the complexity and dimensionality of the grouping analysis. For example, the visit data stored in DataMart 114 may include tens of thousands of different types of page visits. After defining and mapping SuperPages however, this same visit data may reflect, for example, only around 100 SuperPage visits. This reduction in dimensionality, as well as the additional information provided by the SuperPages mapping itself, allows for dramatically improved performance by the data mining components used to create the SuperVisit clusters.

The automated clustering tools employed in the Data Mining and Visualization Components 128 (FIG. 2) of the invention can be any of a variety of known clustering means for organizing observed data into meaningful clusters such as hierarchical clustering algorithms (e.g., Tree Clustering, Block Clustering) or relocational clustering algorithms (e.g., K-means Clustering). One preferred clustering approach for use with the invention is a two-stage clustering method such as BIRCH in which a sequential cluster method is applied to the target data to compress dense data regions and form sub-clusters, then a cluster method is performed on the sub-clusters to find the desired number of clusters. BIRCH is also a preferred clustering method for use with the invention because of its scalability. A more detailed discussion on the implementation of BIRCH-type two-stage clustering can be found in Zhang et al., "BIRCH: An efficient data clustering method for very large databases," *Proceedings of the ACM SIGMOD Conference on Management of Data*, pp. 103–114 (1996), which is hereby incorporated by reference.

One implementation of a two-stage clustering method useful in the Data Mining and Visualization Components 128 (FIG. 2) is the TwoStep Cluster Component licensed by SPSS Inc. of Chicago, Ill. Pre-clustering in the first stage of the two-stage clustering method can employ a sequential clustering approach in which data records (such as DataMart 114 visit records with SuperPage dimensions) are scanned one at a time to decide if each record should merge into previously formed clusters or start a new cluster of its own within a cluster feature tree. An important feature of this pre-clustering stage is that it possesses the ability to cluster on categorical as well as continuous variables. The second, cluster stage of the two-stage clustering method takes the first stage sub-clusters as input and groups them into the desired number of clusters. The number of clusters can also be determined automatically by clustering component.

Because the number of visits represented in DataMart 114 can be very large, Data Mining Components 128 (FIG. 2) preferably allow a user to choose a specific number of visits for modeling with the visits being obtained randomly from the filtered visits represented in the DataMart. In this way, the user can provide the required sampling of data to the clustering components for both training and validation while doing so in a time and computing resources efficient manner. A framework 200 user can also determine the percentage of sampled data to be applied for training and for validation, and can also set the minimum and maximum number of clusters desired from the analysis.

Each training or validation data set consists of a number of data rows (one per visit) that contain attribute values. The training data set is used for building the clustering model while the validation data set is used for validating the generality of the model. To validate the generality, the visits in both data sets can be scored by SuperVisits identifications according to the model and their characteristics can be compared or studied individually through visualization.

A framework 200 user can visualize SuperVisit characteristics by, for example, (1) building decision trees on the clusters (FIG. 3A), to illustrate how SuperVisits (in the example of FIG. 3A, Widely Reached and Narrowly Focused) relate to specific Web behavior (in this example, whether the Search, Login and Product-Compare SuperPages are visited); (2) displaying matrix graphs (FIG. 3B) to examine the differences in the distribution of attribute values from cluster to cluster, one attribute at a time; or (3) drawing 3D scatter plots (FIG. 3C) to see how clusters are affected by changes in selected attributes. These visualization approaches can also be combined. For example, based on the matrix graph, one can understand which attributes are most significant in determining cluster membership because the selected attributes are displayed in the order determined by their significance in the decision tree. After understanding the nature of SuperVisits, a framework user can give descriptive names to SuperVisits, such as naming the SuperVisits at a brokerage site "Research" and "Trading."

Visualization components may generally be provided in the system of the invention illustrated in FIG. 2 with Data Mining and Visualization Components 128. In one embodiment, visualization can be provided by an application server such as a Java application server, which can deliver Web content for distribution to clients 130 through a Web Server 132. One visualization tool package deployable to the described end in such a system is nViZn™ (also licensed by SPSS Inc. of Chicago, Ill.), an object-oriented, Java-based software development kit for developing applications with quantitative graphics.

Once a SuperVisit model is created and validated, all of the visits represented in DataMart 114 can be scored according to the model and the mapping between visits and SuperVisits can be stored in the DartMart 114. One tool for deploying the SuperVisit model to score visits SmartScore, also licensed by SPSS Inc. of Chicago, Ill. Once the visits have been scored, all aspects of Web behavior can be analyzed with respect to SuperVisits using, for example, multidimensional data analysis tools.

Figure 3:
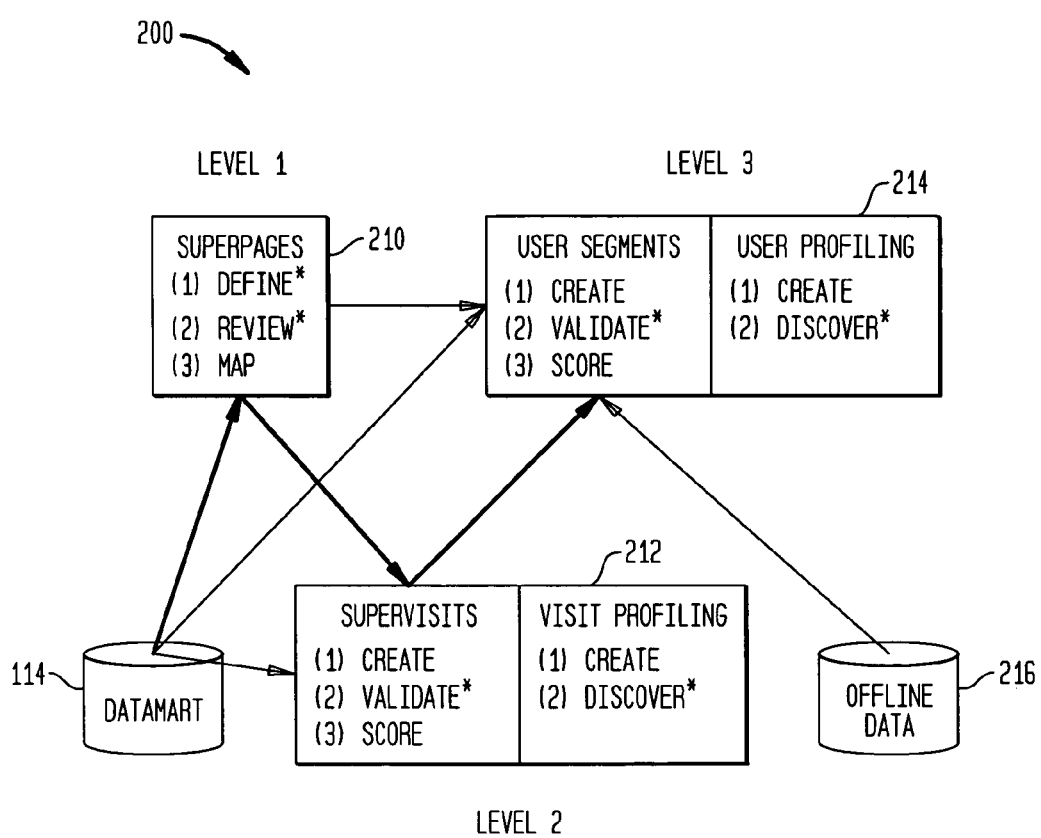
FIG. 3 illustrates a framework for performing data mining analyses on data representing user requests.
Figure 3A:
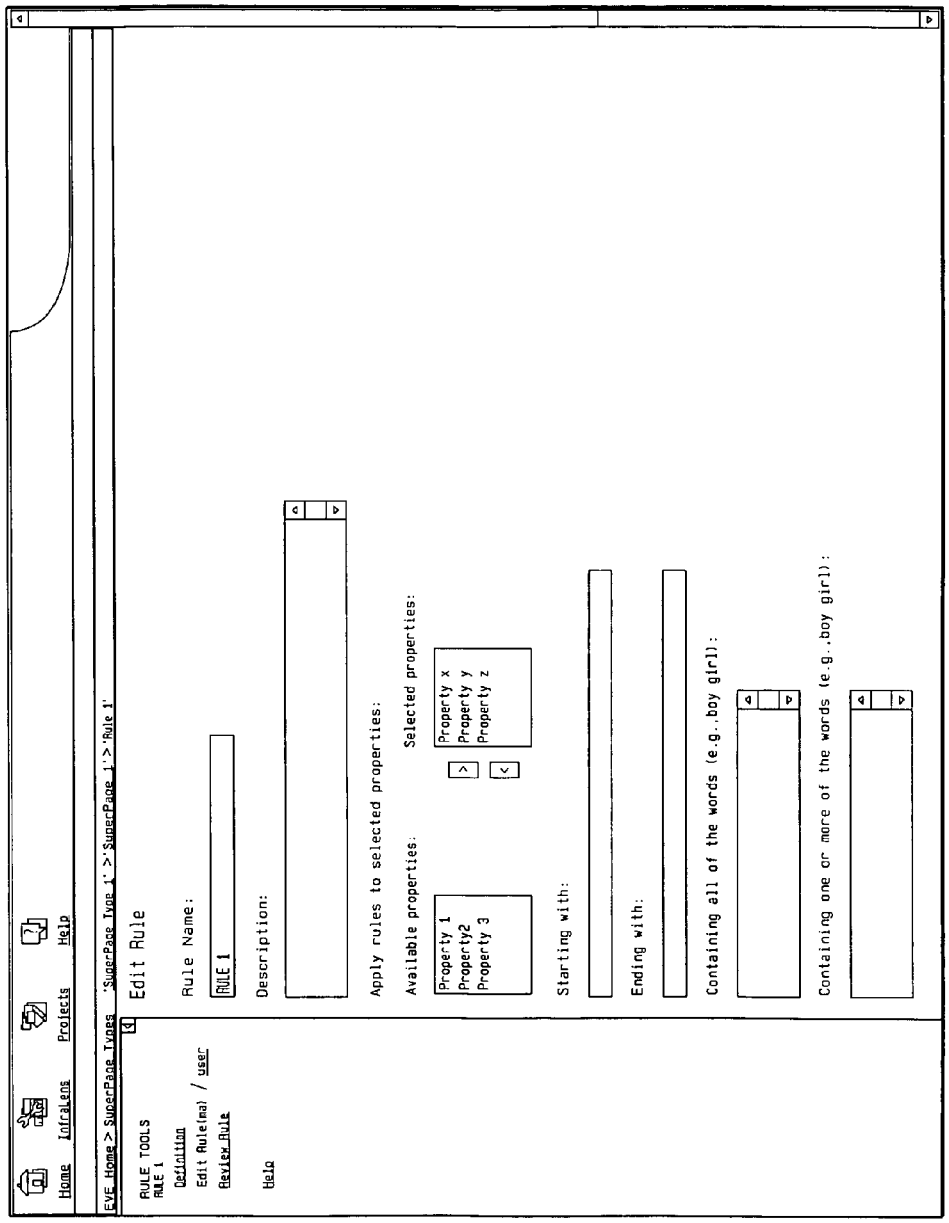
FIG. 3A illustrates an input screen for defining Super-Pages.
Figure 3B:
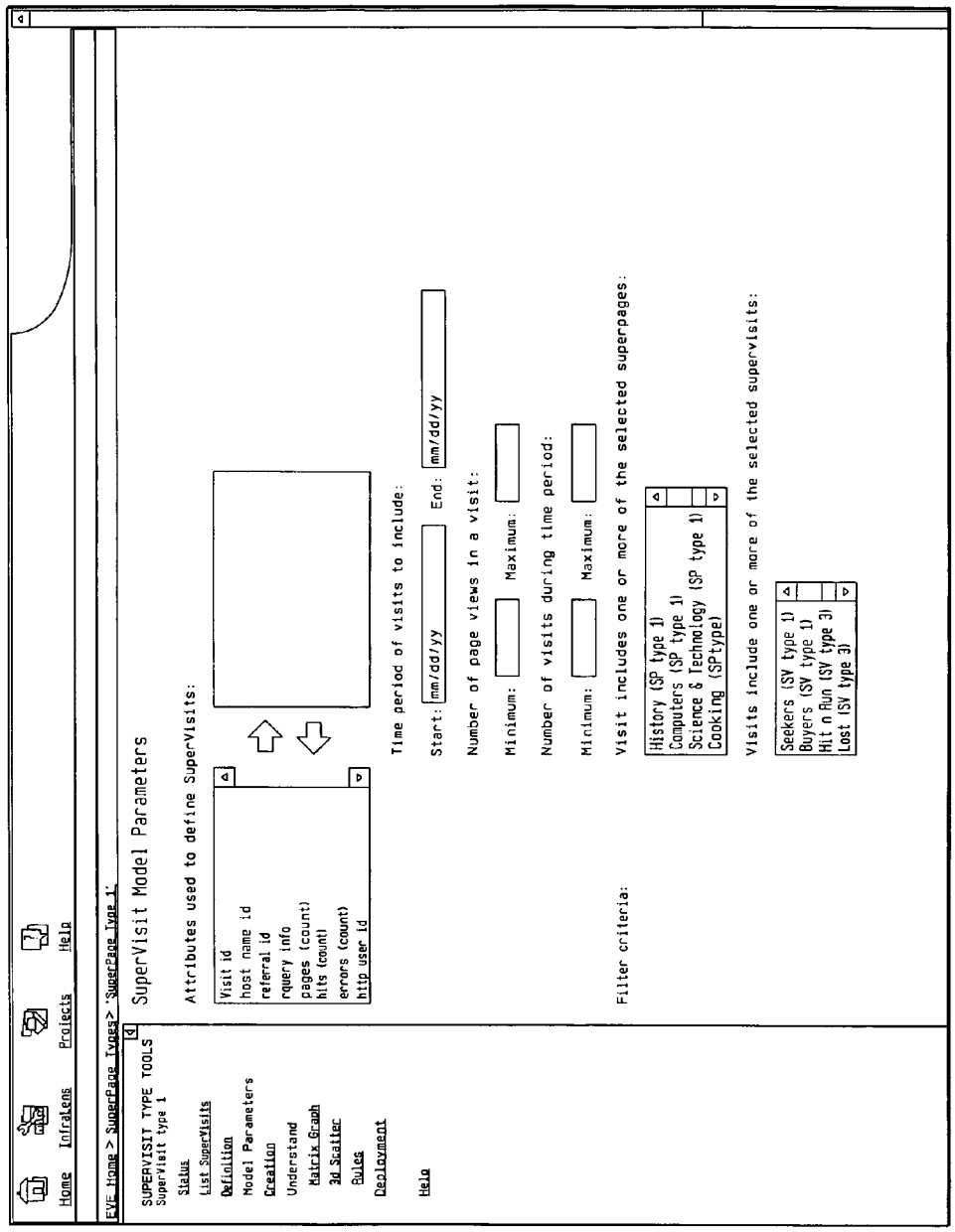
FIG. 3B illustrates an input screen for modeling Super-Visits.
Figure 3C:
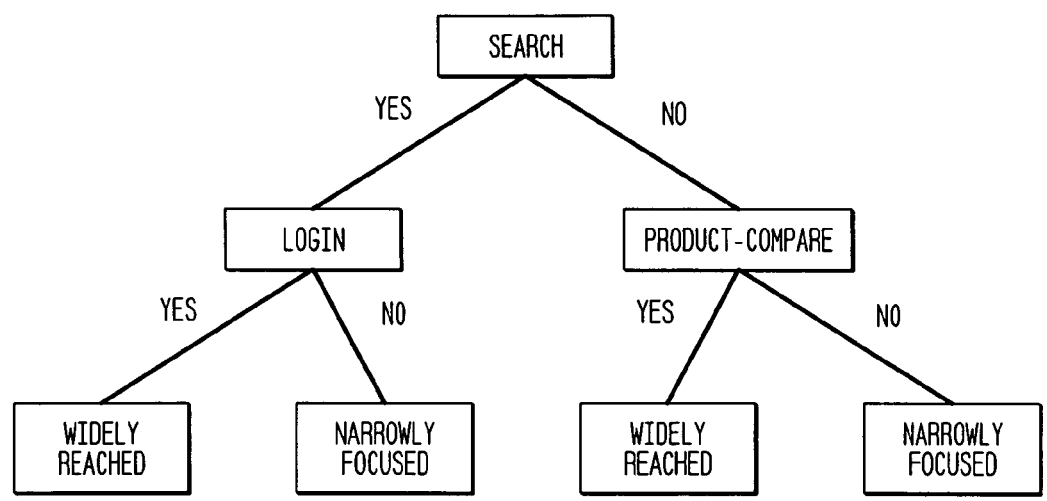
FIG. 3C illustrates a decision tree visualization of a SuperVisit.
Figure 3D:
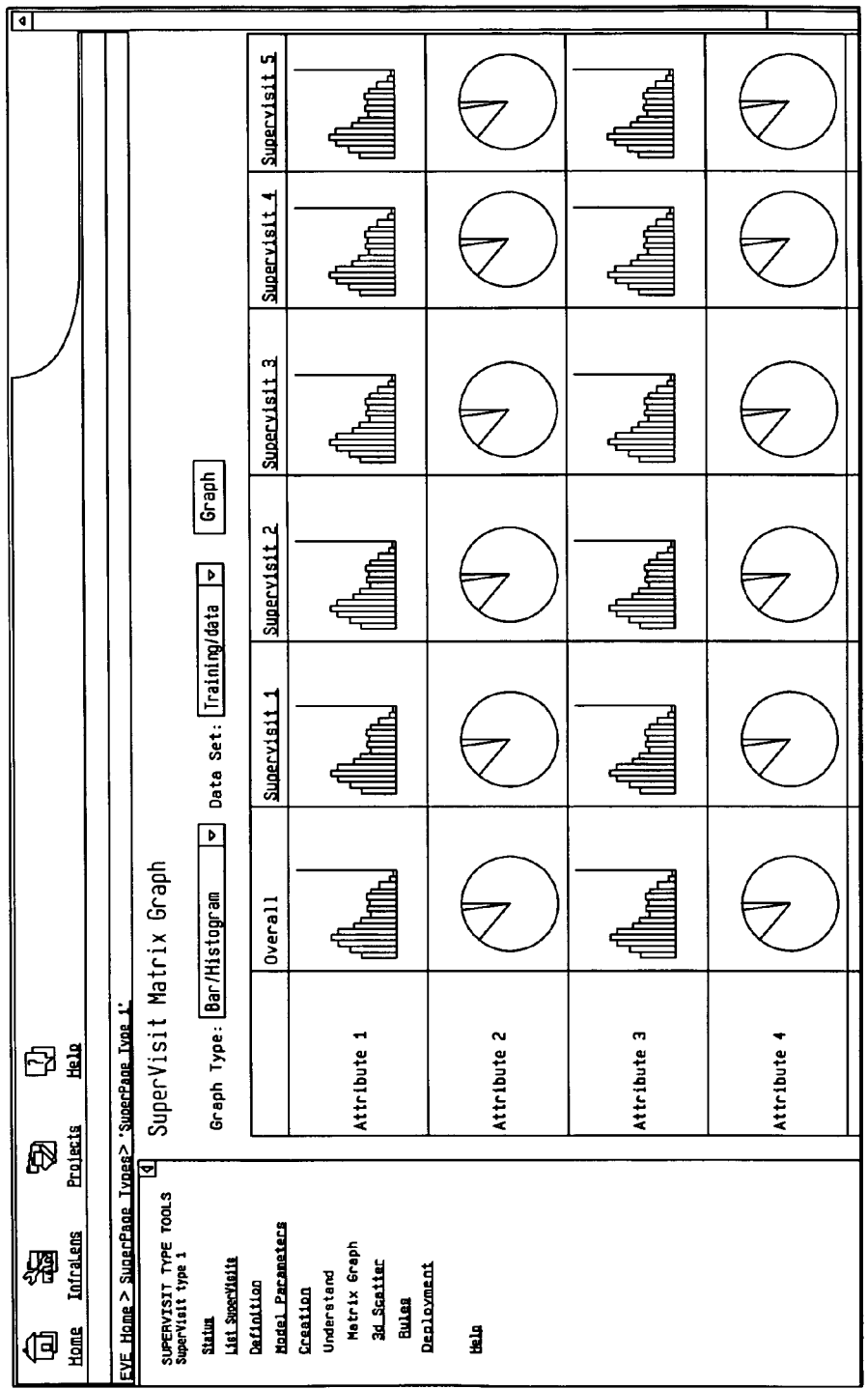
FIG. 3D illustrates a matrix graph visualization of a SuperVisit.
Figure 3E:
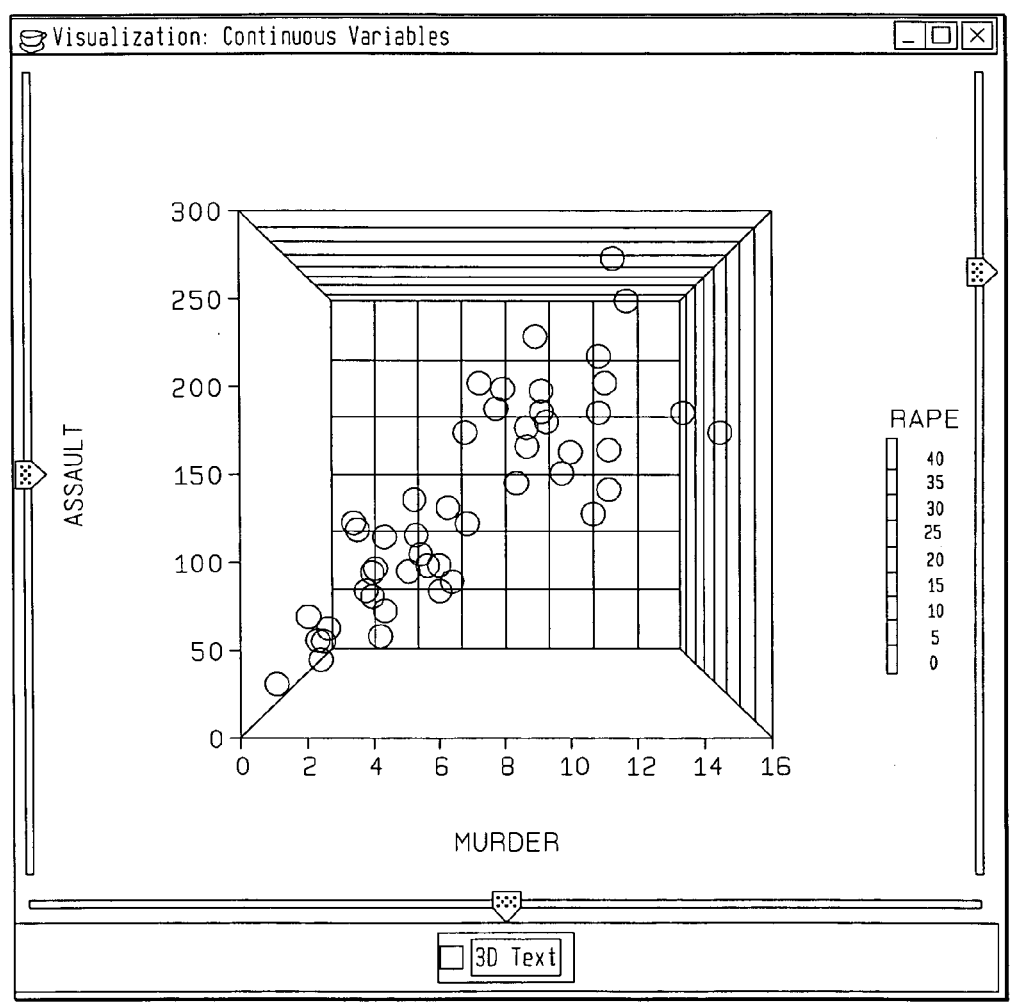
FIG. 3E illustrates a 3D scatter plot visualization of a SuperVisit.

Returning to framework 200 of FIG. 3, automated data mining techniques can be applied at a third, User Segment level 214 to SuperPage and SuperVisit data to discover User Segments. In general, a User Segment is a group (or cluster) of like users. Users that belong to the same User Segment tend to be similar, while users that belong to different User Segments tend to be dissimilar. It is important to note that the visits of a particular user can have different SuperVisit classifications. By segmenting users based on SuperVisits, users can be grouped according to their site behavior beyond the scope of pages or SuperPages they visited.

Just as for SuperPages and SuperVisits, there can be multiple types of User Segments; each type representing a different way of segmenting the users. For example, types might be designated as "Interest Profile," "Receptiveness to Online Promotions," or "Browser to Trader Spectrum" at a brokerage site. Each of these types of segmentation may use completely different inputs and may result in very different segmentations and each visit can belong to a different segment within each segment type.

The process of clustering users into User Segments is similar to the process of clustering visits into SuperVisits. A framework 200 user can select attributes, specify user filter criteria, choose a sampling rate, determine a percentage split for training data and validation data, and provide both the minimum and maximum numbers of clusters. The key difference between SuperVisit modeling and User Segment modeling is attributes available. Potential attributes for modeling User Segments include (1) SuperPages, (2) Super-Visits, (3) user-level E-Metrics (e.g., recency and the number of page views, time-per-visit), (4) geographic/technographic identifiers (e.g., an organization type identifier), (5) user type flags (e.g., first-time and/or registered user), (6) user aggregate attributes (e.g., the number of visits during last 7 days), and (7) equally important offline data 216 if available (e.g., dollars spent and product item names/numbers).

Framework 200 users can also visualize User Segment characteristics (using the same visualization tools used to visualize SuperVisits) by matrix graph, 3d scatter plot and decision rules to understand which attributes are most significant in determining segment membership. Users can give descriptive names to User Segments: for a brokerage site such names might include "Pure Researcher," "Pure Trader," and "Mixed User." Once the model is validated, it can be deployed to score user data in DataMart 114 according to the User Segment clusters discovered. Once the user data has been scored, all aspects of Web behavior can be analyzed with respect to User Segments using, for example, multidimensional data analysis tools.

A framework 200 user may also profile visits or users using a classification component in Data Mining and Visualization Components 128. Classification is the act of mapping data items into a number of predefined classes based on certain criteria. A framework 200 user is often interested in developing a profile of users belonging to a particular class or category. This requires extraction and selection of attributes that best describes the properties of a given class or category. Common classification algorithms include decision tree classifiers, naïve Bayesian classifiers, k-nearest neighbor classifiers, and back-propagation networks. By properly framing the classification problem, these algorithms can also be used for prediction. For example, classifcation of usage data coupled with registration data may lead to the discovery of a rule stating that "If a user has registered on the site, logged in and used the search function, s/he is likely to purchase a product."

The classification component constructs decision trees/rules automatically to relate selected attributes to the target attribute. Once a behavior profile is created, the classification component will display decision rules and their error rates for both training and validation data sets. The difference between two error rates reveals the generality of the behavior profile. A framework 200 user can create as many behavior profiles as necessary. In addition, a framework 200 user can choose any available attribute as a target (e.g., a purchase SuperPage). For example, buyers (target) can be characterized as users/visitors that have either purchased an item during last 90 days (attribute 1), or have spent more than 5 minutes on the site (attribute 2) and have viewed a product SuperPage (attribute 3).

The setup for visit-level profiling or user-level profiling can be similar to setup dialogs used for SuperVisits or User Segments, respectively, except that there can be additional advanced options available for stopping the growing of decision trees as well as pruning decision trees. One commercially available classification component useful with the invention is the CART component of AnswerTree, licensed by SPSS, Inc.

In addition to classification and visualization of visitor behavior with respect to SuperPages, SuperVisits and User Segments, as mentioned above, multidimensional analysis tools used to analyze online metrics (referred to herein as "Web mining") can also be used with the invention to further analyze online metrics, such as "E-Metrics," with respect to SuperPages, SuperVisits and User Segments. E-Metrics are operational metrics that express the relationships among customers, Web sites, and financials, and describe e-customer behavior in the context of an overall business. E-Metrics include traditional metrics, core Web measurements such as the total number of hits, page views, visits, and user, and new measurements such as stickiness, focus, migration rate and reach. For example, for a given site section, stickiness is defined as the average time spend per user; focus as the average number of pages visited divided by the total number of pages in the section, migration rate as the average number of visits exited divided by the average number of visits entered, and reach as the number of visits reached divided by the total number of visits. The system of the invention thus provides the ability to use multidimensional analysis tools to drill down to clusters at each of three levels of logical view user behavior data. This provides the ability to associate (and thus compare, visualize and perform trend analysis of) E-Metrics with each of three clustering levels. For example, a framework 200 user can analyze the stickiness of SuperPages, the average duration of SuperVisits, and the average visit frequency of a User Segment. Further information on customer behavior metrics useful with the invention may be found in the "E-Metrics, Business Metrics For The New Economy," published by NetGenesis Corp. and available at www.netgen.com/emetrics and in the instant patent application file, and which is hereby incorporated into this description by reference.

E-Metrics can be used as input attributes in using framework 200 (e.g., for clustering or classification) as E-Metrics tend to be effective indicators for an e-business. For example, one can cluster users based on the number of visits, pages visited, duration, and stickiness. Such an analysis can lead to an understanding of the key determining factors for whether a user is likely to be a repeat visitor or not. Web mining can also validate the usefulness of E-Metrics for each specific analysis case. When manually defined E-Metrics are used by Web mining, one can determine their degree of contribution and their influence direction on customer behavior by analyzing Web mining results. For example, stickiness can be determined as either a positive, negative, or null factor influencing buying behavior on a specific Web site. Web mining can also discover potential new E-Metrics. When meaningful clusters or rules are discovered, a framework 200 user can determine whether these discoveries can be described in terms of existing E-Metrics or not. For example, if a certain combination of measurements (e.g., a combination of recency and frequency) exhibits consistently exceptional discriminatory capability in decision rules, this combination can be a candidate for a new E-Metric.

The methods and systems described above were applied to an example on-line business referred to as E-Retail.com, a retailer specializing in selling home furnishings on the Internet. The goal of this exemplary use of the invention is to cluster E-Retail.com Web visits into a small number of homogenous super visits. These different visit types can then be profiled to verify the similarities among visits belonging to the same super visit group and expose dissimilarities among visits that belong to different super visit groups.

Three weeks worth of Web log data from E-Retail.com was processed according to the invention to understand visitor behavior at the E-Retail.com Web site as described above. The Web log data was provided in Microsoft W3C Extended Log Format from thirteen E-Retail.com Web servers. The Web log data was pre-processed using NetAnalysis software from NetGenesis Corp. to sew together the thirteen different log files into a consistent data set and to extract visit, path and http resource information.

The most common E-Retail.com pages were then mapped into clusters (super pages) according to differing types of page content and differing types of page progress. In clustering according to content, clusters were created, for example, based on category search or advice. In cluster according to progress, pages were identified that signify checkout actions; super pages were then created to indicate different checkout stages (e.g., enter a credit card page or complete a transaction page. Super page view indicators could then be rolled up with number of hits, number of page views, errors and visit duration for each visit and all of this data stored in a data mart.

Next, automated clustering means were deployed to discover super visit clusters of visits using a Clementine K-means clustering module. Attributes or inputs to the clustering module for creating the super visits included visits to super pages based on content (progress super pages were used only for profiling and not for clustering), number of hits per visit, and visit duration.

Figure 4:
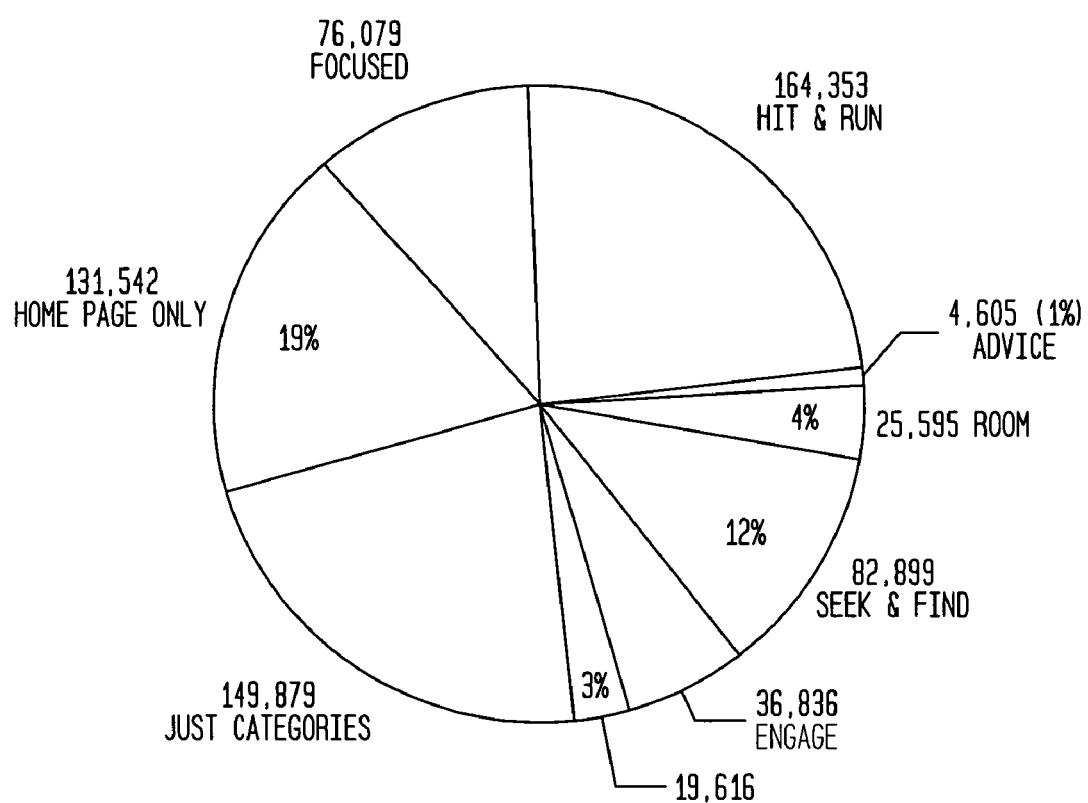
FIG. 4 illustrates a SuperVisit distribution for an exemplary use of the invention.

Nine distinct types of visits (super visits) were discovered: Hit & Run, Advice, Room, Seek & Find, Engage, Seek & Miss, Just Categories, Home Page Only and Focused (the distribution of visits in these super visit clusters is illustrated in FIG. 4).

Hit & Run visits are the most common visits. These visits tend to be short with visitors checking different pages such as promotion, magazine or room planner pages.

Figure 4A:
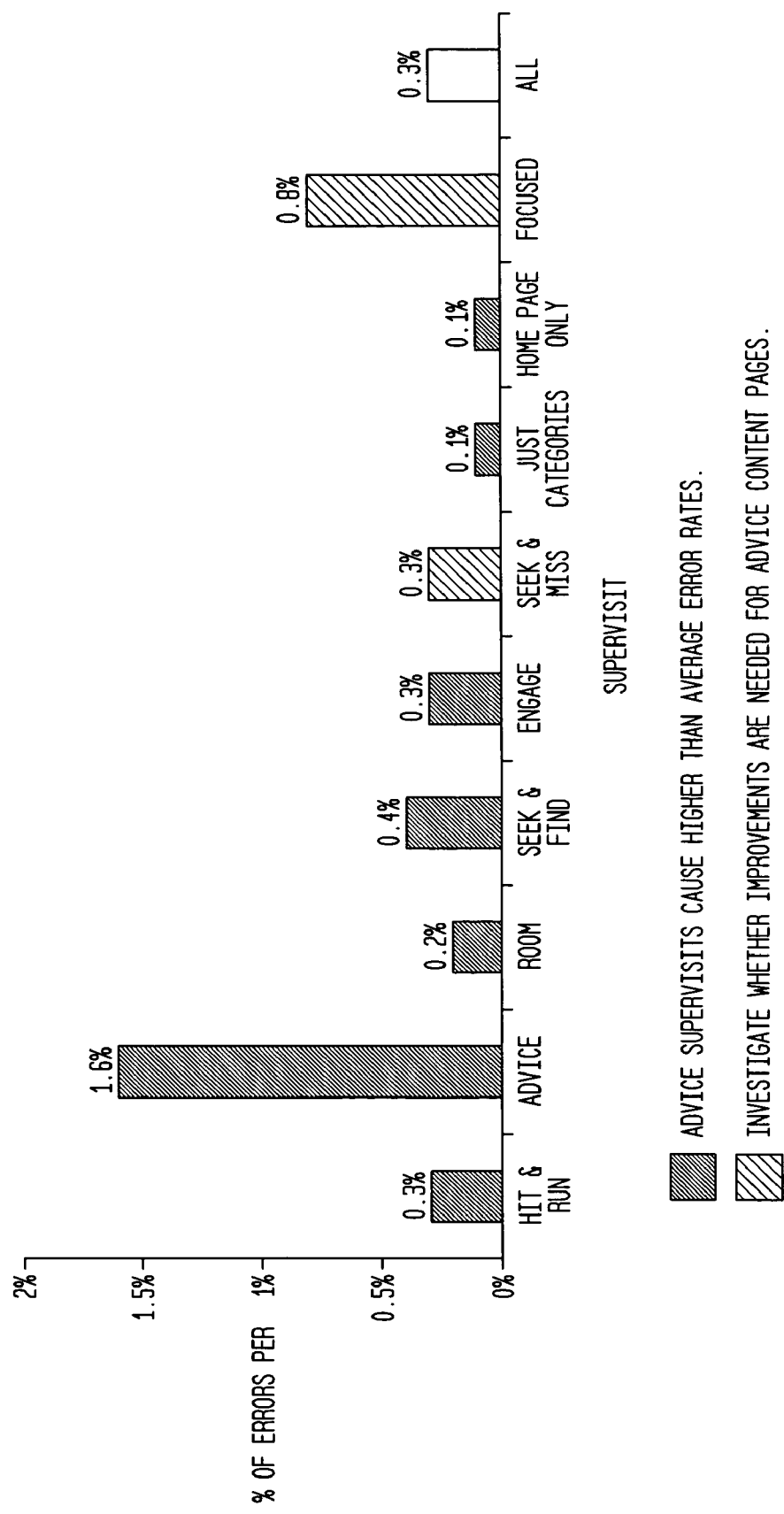
FIG. 4A illustrates error rates for the different SuperVisits illustrated in FIG. 4.

Advice visits are a small group of visits where users mainly view advice pages and sometimes view a specific product or style guide page or perform a category search. These visits do not include completed purchasing transactions. Advice visits cause higher than average error rates (error rate per super visit is illustrated in FIG. 4A), suggesting that improvements may need to be made in Advice content pages to reduce error rates.

Room type visits always include room searches, and often include living room searches.

Seek & Find visits are search oriented visits and 90% of the visits include a viewing of a specific product (a successful search). These are the longest visits with an average of 10 minutes per visit and they rarely reach other page types that do not involve searching (such as advice or promotion pages).

Figure 4B:
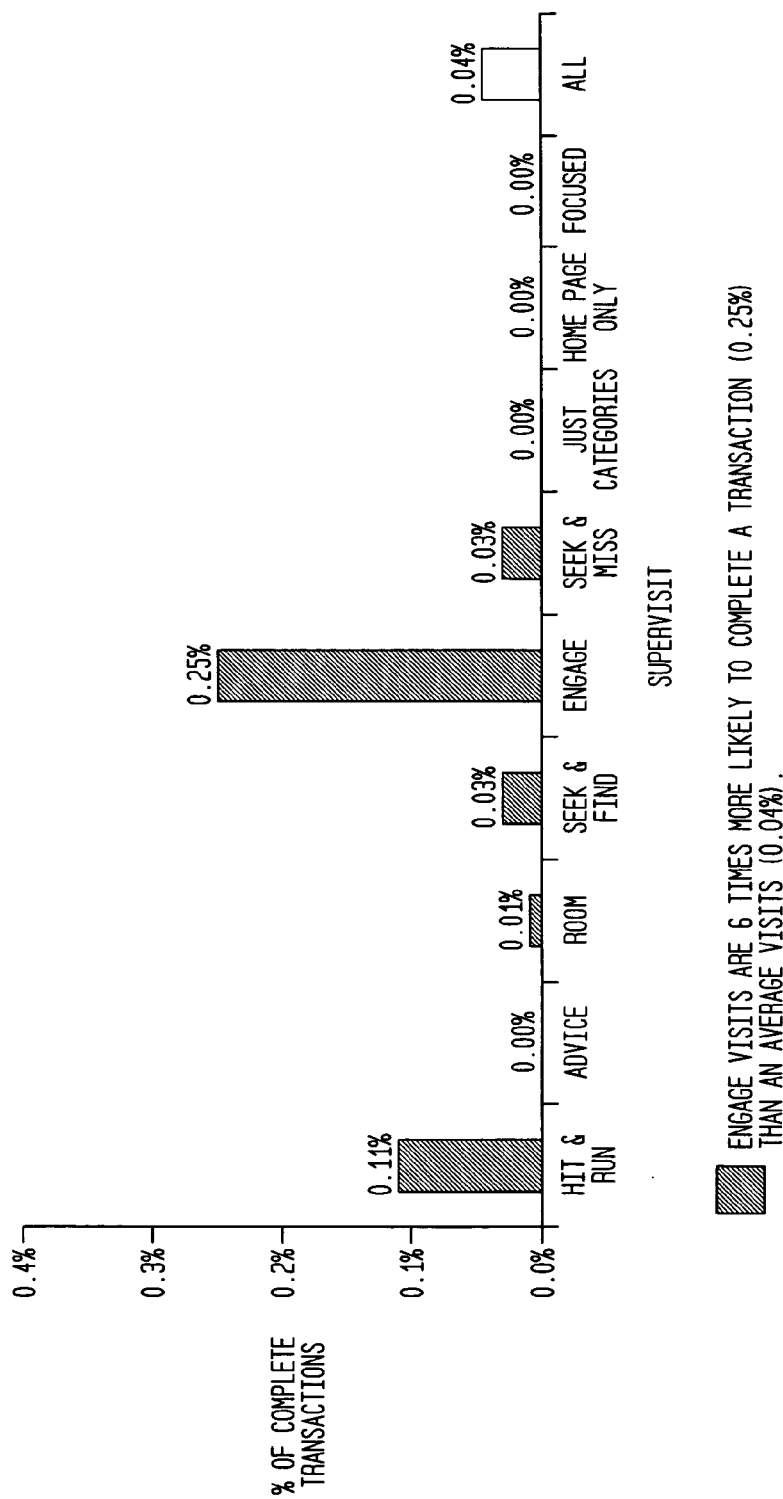
FIG. 4B illustrates the percentage of visits resulting in a completed purchase transaction for the SuperVisits illustrated in FIG. 4B.

Engage visits have the highest number of clicks per visit (more than 6 clicks). These visits always involve navigation through the Home page and viewing of various pages. Engage visits have the highest transaction completion rate (0.25%) among all nine visit types (transaction completion rates for each super visit is illustrated in FIG. 4B).

Seek & Miss visits include searching or the viewing of search results, but they never reach a specific product. Seek & Miss visits average 337 seconds.

Just Categories is the second largest cluster of visits. These visits are similar to Seek & Miss visits, but they last only 35 seconds.

Home Page Only is a large cluster of visits where visitors view only the E-Retail.com Home page and leave the site without ever progressing to other pages.

Focused visits tend to be quick visits to a specific product page without searching. These visits view only product pages.

Results from this analysis show that overall transaction completion rates are very low with only about 0.044% of visits resulting in a completed transaction. As illustrated in FIG. 4C however, visitors who make multiple visit types have significantly higher potential to make a purchase. These high potential users represent a significant opportunity for E-Retail.com as they appear to be users who are about to make a purchasing decision. By acting quickly, E-Retail.com may be able to increase transaction rates by, for example, devising marketing campaigns to target high potential users who do not complete a transaction within a reasonable timeframe.

Users with Focused visits may also represent a significant opportunity for E-Retail.com as they are focused on specific products and apparently know exactly which products they need. In addition, 6.6% of these users come back within the same week using another Focused visit to view their favorite product or products. E-Retail might target each of these visitors with a very specific personalized marketing message pertaining to the visitors favorite products to increase transaction rates from these users.

The methods and systems described above were applied to an second exemplary online business referred to as E-Carrier.com, a cargo shipping company having a Web site through which it can conduct business with its customers. The goal of this exemplary use of the invention is to cluster E-Retail.com Web customers into a small number of homogenous user segments and further, to use progress based SuperPages to create User Segment clusters and view activity within these clusters over time to determine trends in the behavior of E-Carrier.com's online customers.

Data for this example was prepared as described above. Progress based SuperPages, including Home Page, Track Bill, Track History, Login, Start Flight Info, Flight Availability, Start Reservation and Complete Reservation. A User Segment analysis was performed resulting in the following segments:

Trackers (37% of users): Users who track past shipments using a tracking number. These users generally have low duration visits.

Reservers (3% of users): Users who complete online reservations. These users generally have a low duration per page view.

Uncommitted (10% of users): These users are characterized by long duration visits, investigation of availability and reservation areas, and failure to complete a transaction.

Info Gatherers (4% of users): These users concentrate on information areas of the site and rarely reach availability or reservations areas.

Single-clickers (32% of users): Users who visit the homepage only. These users are not qualified customers or prospects.

Wanderers (15% of users): These users have very few, very random page visits and generally have few hits, but long duration per page view.

Figure 5:
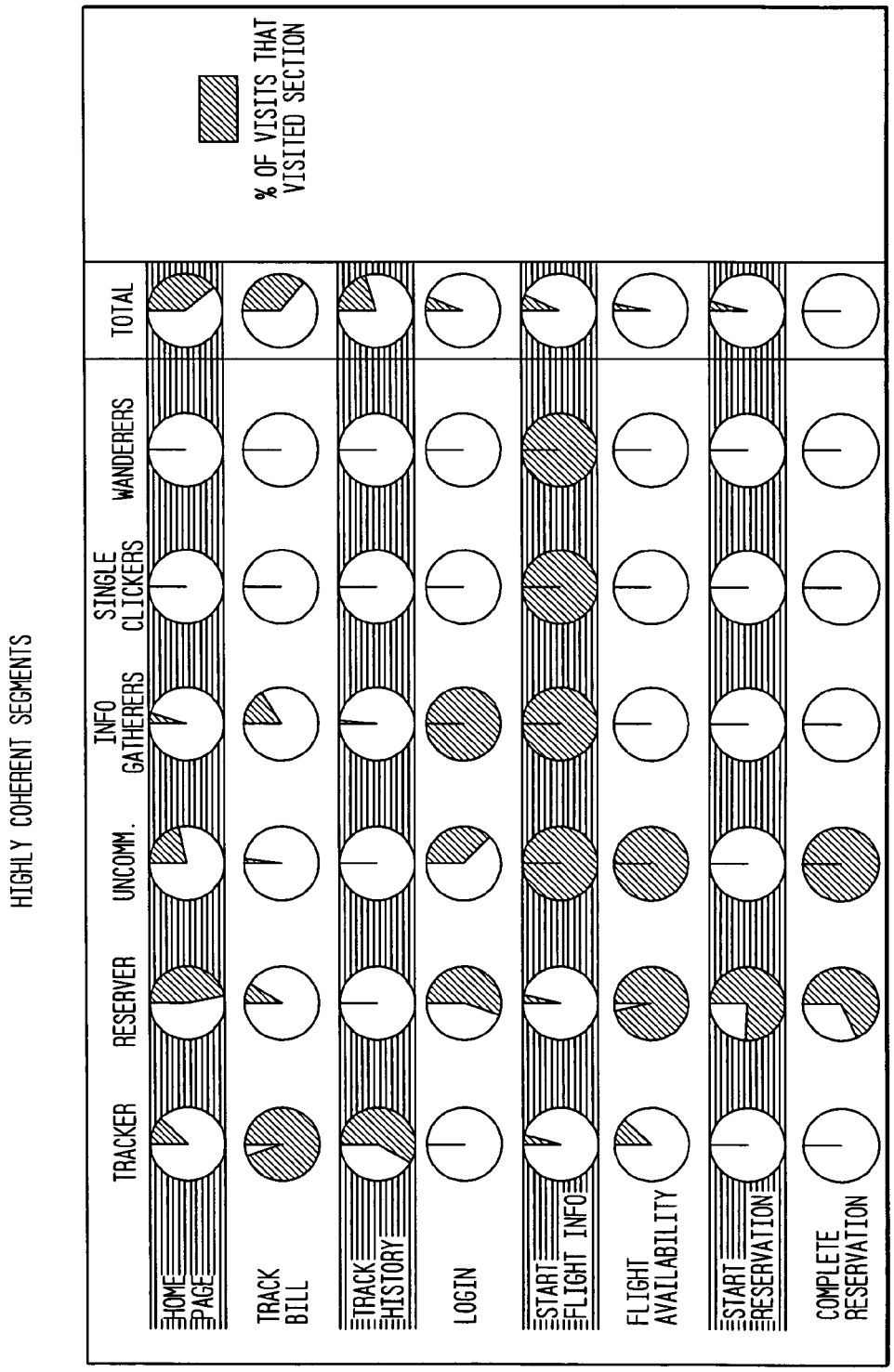
FIG. 5 illustrates a user segmentation of the invention.

FIG. 5 illustrates the percentage of users in each User Segment who visit each of the identified SuperPages.

A further example, illustrated in FIG. 6, shows a behavior differential analysis report showing user behavior over time. This is a financial services example showing behavioral differential analysis of users based on progress-based SuperPages. In FIG. 6, two adjacent months are cross-tabulated, with the metric being user count. The main diagonal represents users whose behavior has not changed substantially from one month to the next. Below the diagonal are users whose behavior is improving (they are getting more engaged in the site). Above the diagonal are users whose behavior is getting worse. Using the systems and methods of the invention, behavior differential analyses can be performed for users falling into any SuperVisit or User Segment over time to show how user behavior changes over time.

It will be understood that the foregoing and following descriptions are only illustrative of the principles of the invention, and that various modifications can be made by those skilled in the art without departing from the scope and spirit of the invention.

What is claimed is:

1. A method for logical view visualization of user behavior in a networked computer environment, wherein the networked computer environment includes resources, pages and sites and the user behavior includes requesting resources, viewing pages and visiting sites, comprising the steps of:
    collecting raw data reflecting user behavior;
    refining the raw data into page views and visit data for storing in a data mart;
    clustering pages to define super pages and storing page to super page mappings reflecting the relationship between pages and super pages in the data mart;
    applying an automated clustering means to the page view, visit and super page data in the data mart to discover clusters of visits to define super visits having visit behavior characteristics; and
    scoring the visit data stored in the data mart against the super visit clusters to classify visits into super visits according to visit behavior characteristics.

2. The method of claim 1, further comprising:
    applying an automated clustering means to the page view and visit data in the data mart to discover clusters of pages to define super pages.

3. The method of claim 1, wherein super pages are defined in at least two types of site semantics including at least one type selected from the group consisting of page content and behavior progress.

4. The method of claim 1, wherein the automated clustering means includes a two-stage clustering method having pre-clustering and clustering stages.

5. The method of claim 1, further comprising employing visualization means to illustrate the relationship between super visit characteristics and user behavior in the networked computer environment.

6. The method of claim 5, wherein the user behavior includes purchase transaction activity.

7. The method of claim 1, wherein a visit to super visit mapping is created during scoring and stored in the data mart.

8. The method of claim 1, further comprising applying a classification means to profile the behavior of users having visits classified as belonging to a super visit.

9. The method of claim 1, wherein visits are classified into a super visit in each of a plurality of super visit types.

10. The method of claim 1, further comprising applying an automated clustering means to page view, visit, super page and super visit data in the data mart to discover clusters of users to define user segments.

11. The method of claim 10, further comprising employing visualization means to illustrate the relationship between user segments and user behavior in the networked computer environment.

12. The method of claim 11, wherein the user behavior includes a purchase transaction.

13. The method of claim 10, further comprising scoring visit data stored in the data mart against the user segment clusters to classify visits into user segments.

14. The method of claim 13, wherein a visit to user segment mapping is created during scoring and stored in the data mart.

15. The method of claim 13, further comprising applying a classification means to profile the behavior of users having visits classified as belonging to a user segment.

16. The method of claim 13, wherein visits are classified into a user segment in each of a plurality of user segment types.

17. A system for logical view visualization of user behavior in a networked computer environment, wherein the networked computer environment includes resources, pages and sites and the user behavior includes requesting resources, viewing pages and visiting sites, comprising:
    an importer means for collecting raw data reflecting user behavior;
    a data mart for storing data;
    a preprocessing means for refining the raw data into page views and visit data for storing in a data mart;
    a clustering means for clustering pages to define super pages and storing page to super page mappings reflecting the relationship between pages and super pages in the data mart;
    an automated clustering means accepting page view, visit and super page data in the data mart for discovering clusters of visits to define super visits having visit behavior characteristics; and
    a scoring means for scoring the visit data stored in the data mart against the super visit clusters to classify visits into super visits according to visit behavior characteristics.

18. The system of claim 17, wherein the clustering means for clustering pages to define super pages and storing page to super page mappings reflecting the relationship between pages and super pages in the data mart is an automated clustering means.

19. The system of claim 17, wherein the clustering means for clustering pages to define super pages and storing page to super page mappings reflecting the relationship between pages and super pages in the data mart is a manual clustering means allowing selection of a plurality of attributes to cluster pages.

20. The system of claim 17, wherein super pages are defined in at least two types of site semantics including at least one type selected from the group consisting of page content and behavior progress.

21. The method of claim 17, wherein the automated clustering means accepting page view, visit and super page data in the data mart for discovering clusters of visits to define super visits having visit behavior characteristics includes a two-stage clustering method having pre-clustering and clustering stages.

22. The system of claim 17, further comprising a visualization means for illustrating the relationship between super visit characteristics and user behavior in the networked computer environment.

23. The system of claim 22, wherein the user behavior includes purchase transaction activity.

24. The system of claim 17, wherein a visit to super visit mapping is created during scoring and stored in the data mart.

25. The system of claim 17, further comprising a classification means for profiling the behavior of users having visits classified as belonging to a super visit.

26. The system of claim 17, wherein visits are classified into a super visit in each of a plurality of super visit types.

27. The system of claim 17, further comprising an automated clustering means accepting page view, visit, super page and super visit data from the data mart for discovering clusters of users to define user segments.

28. The system of claim 27, further comprising a visualization means for illustrating the relationship between user segments and user behavior in the networked computer environment.

29. The system of claim 28, wherein the user behavior includes purchase transaction activity.

30. The system of claim 27, further comprising a scoring means for scoring visit data stored in the data mart against the user segment clusters to classify visits into user segments.

31. The system of claim 30, wherein a visit to user segment mapping is created during scoring and stored in the data mart.

32. The system of claim 30, further comprising applying a classification means to profile the behavior of users having visits classified as belonging to a user segment.

33. The system of claim 30, wherein visits are classified into a user segment in each of a plurality of user segment types.

* * * * *